Dec. 9, 1924.

H. NYQUIST

ELECTRICAL MEASURING APPARATUS

Filed Oct. 28, 1921

1,518,543

INVENTOR
H. Nyquist
BY
ATTORNEY

Patented Dec. 9, 1924.

1,518,543

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

ELECTRICAL MEASURING APPARATUS.

Application filed October 28, 1921. Serial No. 511,003.

*To all whom it may concern:*

Be it known that I, HARRY NYQUIST, residing at Elmhurst, in the county of Queens and State of New York, have invented certain Improvements in Electrical Measuring Apparatus, of which the following is a specification.

This invention relates to electrical measuring apparatus and particularly to means for determining the presence of harmonics in a circuit resulting from the distortion of a sinusoidal wave of a definite frequency by apparatus connected into the circuit.

In the development of new electrical apparatus, particularly that designed for use in signaling circuits, it is frequently desirable to determine whether such apparatus will produce harmonics when a sinusoidal wave of a definite frequency is impressed thereon.

One of the objects of this invention is to provide a circuit arrangement adapted to indicate the presence and to determine the type of harmonics produced by apparatus connected into the said circuit. Another object of this invention is to provide a simple frequency standard which is less liable to change its characteristics owing to the nature of the elements that are used in its construction.

Figure 3:
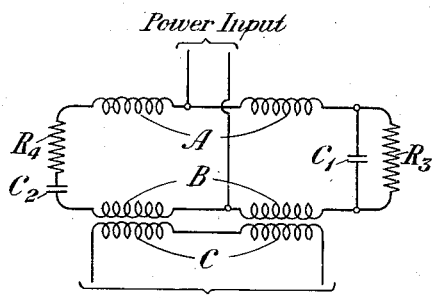
Figure 4:
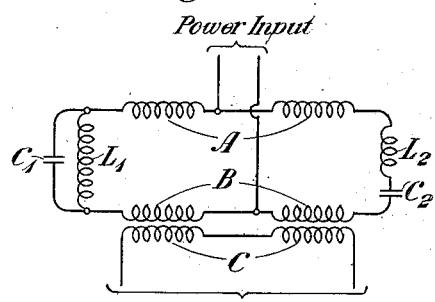
Figure 5:
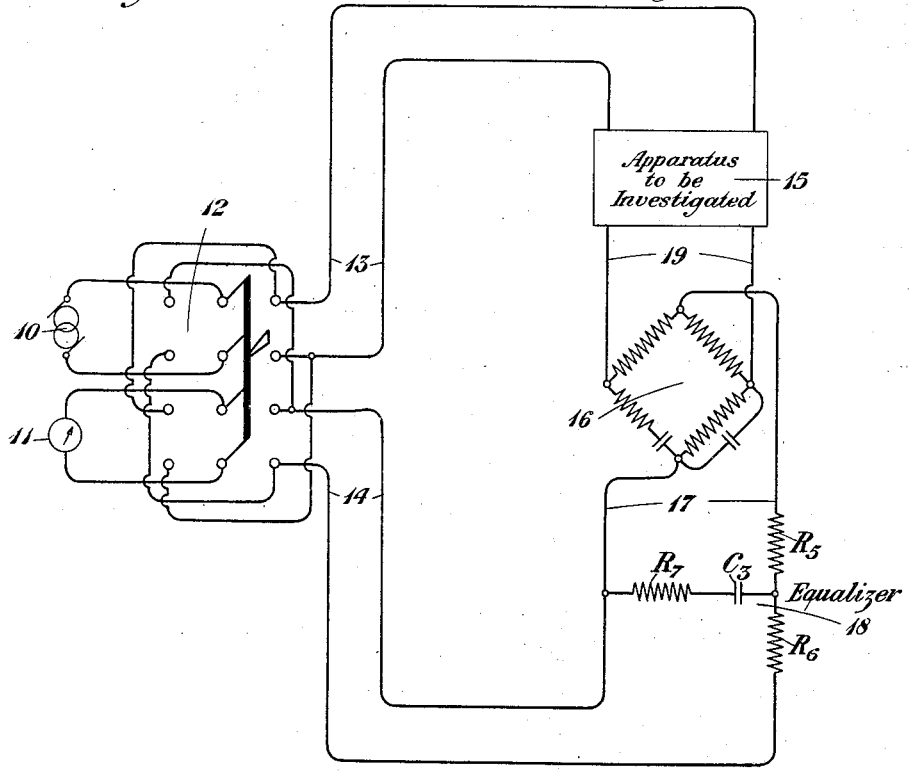

This invention will be better understood from the following description when read in connection with the attached drawings, of which Figs. 1, 2, 3 and 4 represent four types of networks that are adapted for use in connection with this invention, and Fig. 5 represents a circuit arrangement in which any of the networks shown in Figs. 1 to 4 inclusive may be embodied.

The networks shown in Figs. 1 to 4 inclusive are designed to be balanced for a single definite frequency. Accordingly, when a voltage wave of the predetermined frequency is impressed across the input side of the network there will be no difference of potential across the output side of the network and consequently no current will be detected by the indicating device or detector connected with the output circuit.

Figure 1:
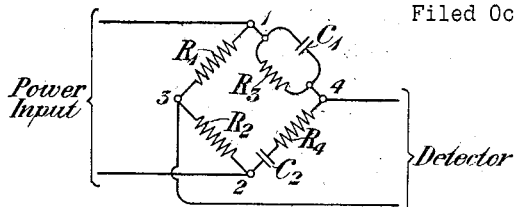

In Fig. 1, the network is in the form of the well known Wheatstone bridge and comprises the resistances $R_1$ and $R_2$, which are equal in magnitude and constitute two arms of the bridge network. The third arm comprises a resistance $R_3$ in parallel with the condenser $C_1$ and the fourth arm comprises a resistance $R_4$ in series with the condenser $C_2$. The magnitudes of the various resistances and condensers are so chosen that for a predetermined frequency the bridge network is prefectly balanced. The input circuit is connected with the corners 1 and 2 of the bridge network and the output circuit with the corners 3 and 4. It will be apparent that when a voltage of the definite frequency for which the arrangement is balanced is impressed across the corners 1 and 2 there will be no difference of potential across the corners 3 and 4 to which the output circuit is connected. It will also be apparent that for any other frequency the bridge will not be balanced and consequently some current will pass through the network from the source to the detector connected with the output circuit. The arrangement in Fig. 2 is also in the form of a Wheatstone bridge network comprising equal resistances $R_1$ and $R_2$, constituting two arms of the bridge, another resistance $R_3$ constituting the third arm of the bridge, and a resistance $R_4$ in series with an inductance $L_1$ and a condenser $C_2$, constituting the fourth arm of the bridge.

Figure 2:
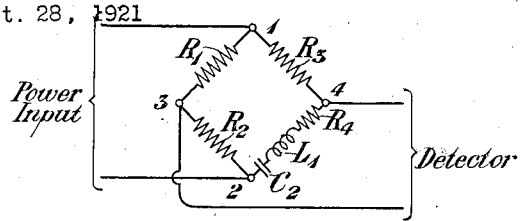

Figs. 3 and 4 differ from Figs. 1 and 2 in that the network in the former is in the form of the well known hybrid coil instead of the Wheatstone bridge, as in Figs. 1 and 2. The hybrid coil, which is a triple-winding transformer, is so designed that when a voltage is applied across the midpoints of two of the said windings, no effect will be produced in the output circuit connected with the third winding, provided the networks connected with the said first two windings balance each other for the frequency of the impressed voltage. Thus, in Fig. 3, A, B and C represent the three windings of the hybrid coil which for the purpose of description are shown divided instead of as single coils. The input circuit is connected across the midpoints of windings A and B, and the output circuit having a detector connected therewith is connected across the winding C. Connected across the left-hand end of windings A and B is a resistance $R_4$ in series with a condenser $C_2$. Connected across the right-hand terminals of windings A and B is a resistance $R_3$ in parallel with a condenser $C_1$. It will be apparent that Fig. 3 is similar to Fig. 1 in that the balancing networks at the left-hand side and the right-hand side of windings A and B are similar to the networks comprising the third and fourth arms of the Wheatstone bridge arrangement shown in Fig. 1.

In the balancing arrangement shown in Fig. 4, in which a hybrid coil is used, the balancing networks associated with the windings A and B consist of two resonant circuits. The resonant circuit shown at the left-hand side consists of an inductance $L_1$ in parallel with a condenser $C_1$ and that shown at the right-hand side consists of an inductance $L_2$ in series with a condenser $C_2$.

The arrangement shown in Fig. 5 shows the application of the circuits represented by Figs. 1 to 4 for the measurement of harmonics produced by apparatus connected with the circuit of Fig. 5. In the figure, 10 represents a source of sinusoidal voltage of a predetermined frequency which is connected with the four pole double throw switch 12 in order that it may be connected with the test circuit in certain definite ways. 11 represents a meter which may be of any well known type such as an ammeter or a harmonic analyzer, such as shown in the copending application of Hitchcock, Serial No. 371,954, dated April 7, 1920. The conductors 13 serve to connect the switch 12 with the input side of any apparatus 15, such, for example, as a coil which by its nature is adapted to produce harmonics of the impressed voltage. The output side of the apparatus 15 is connected with a network 16. The network shown is that represented by Fig. 1 although it is to be understood that any of the networks represented by Figs. 1 to 4 inclusive may be used in the testing circuit without varying the scope of the invention. The output circuit of the network is connected by the conductors 17 to an equalizer 18, which in turn is connected by conductors 14 to the switch 12. The equalizer shown consists of the resistances $R_5$ and $R_6$ in series with one side of the circuit, and the resistance $R_7$ in series with the condenser $C_3$, bridged across the sides of the circuit. The function of this equalizer is to insure that the magnitude of the various harmonics produced by the apparatus 15 will be approximately the same when impressed across the conductors 14, which will be connected with the detecting device 11. It is evident that the transmission efficiency of network 16 differs for different harmonics being better for the higher ones. Accordingly the equalizer 18 is designed to diminish the amplitude of the higher harmonics relative to the lower ones so as to make the resultant transmission efficiency of network 16 and equalizer 18, connected in tandem, substantially the same for all harmonics.

Having in mind the foregoing description of the parts of the apparatus and of the circuit arrangement in which the invention is embodied, the nature of the invention will be apparent from the following description of the mode of operation of the circuit. When the switch 12 is operated toward the left, the source of sinusoidal voltage 10 is connected through the contacts of the said switch with the conductors 14 and in like manner the indicating instrument 11 is connected through the contacts of the said switch with the conductors 13. The voltage from the said source is impressed by the conductors 14 and 17 across opposite corners of the network 16. Since the frequency of the voltage is that for which the network is designed to be balanced, no voltage will be impressed across the conductors 19 which are connected with the apparatus to be investigated, and consequently, no current will appear in the circuit of conductors 13, which as stated is connected with the indicating instrument 11. From the foregoing it will be noted that the apparatus of the circuit is so arranged that the energy from the source 10 passes through the apparatus to be investigated 15, the balanced network 16 and the equalizer 18, all connected in tandem. By reversing the switch 12 it is possible to reverse the order in which energy traverses these pieces of apparatus. Accordingly, if the impedance of the source is equal to the impedance of the indicating instrument the transmission should be the same in either direction through the circuit so that unless harmonics are generated in the circuit the current entering the circuit of the indicating instrument should be independent of the position of the switch. Furthermore, the constants of the balancing network 16 are so chosen that the fundamental frequency is completely balanced out. Consequently, the energy appearing in the circuit of the indicating instrument will consist altogether of harmonics generated by the apparatus 15 and also any residual harmonics that may have been present in the source.

If the switch 12 is operated toward the right, the source 10 will be connected through the contacts of the said switch with the conductors 13 and the indicating instrument 11 will in like manner be connected with the conductors 14. Accordingly, the sinusoidal voltage wave will be impressed by the conductors 13 across the apparatus 15 and the resultant voltage will in turn be impressed by the conductors 19 across opposite corners of the network 16. If harmonics of the fundamental frequency have been generated by the apparatus 15, these harmonics will be transmitted through the network 16 but the fundamental frequency will be suppressed therein. The harmonics appearing in the output circuit 17 will pass through the equalizer 18 which will tend to equalize the magnitude of harmonics present. The resultant harmonics will be impressed by the conductors 14 across the indicating instrument 11. If this instrument is in the nature of a harmonic analyzer the harmonics present may be exactly determined.

If the apparatus 15 is a unidirectional device, the method heretofore described of transmitting the current through the said apparatus in opposite directions cannot, of course, be applied. In such case the principle of this invention can be applied either by providing a pure sine wave from the source or by providing another piece of apparatus, having the same transmission characteristics as the apparatus 15 under investigation, but having linear characteristics which can be substituted for the apparatus under investigation by suitable switching means whenever current is transmitted through the circuit in the direction opposite to that in which the unidirectional device is designed to transmit.

It will be seen from the foregoing description that this invention provides simple and effective means for determining the presence and nature of harmonics produced by apparatus connected with the said circuit. By means of the balanced network, the current of the fundamental frequency, which is of much greater amplitude than the harmonics impressed thereon, is prevented from reaching the current investigating apparatus, thereby increasing the accuracy of investigation and measurement of the said harmonics which pass through the said network to the said current investigating apparatus.

It is clearly apparent that another use to which this invention may be put is in determining whether the frequency from a certain source is the frequency desired for any purpose. Since it is sometimes desirable to duplicate a predetermined frequency with great precision it is necessary that the apparatus for measuring this frequency should be of a type which is not susceptible to error. The arrangement shown in Fig. 1 lends itself well for this purpose. Since such arrangement comprises only resistances and condensers which are not liable to change their constants easily, its impedance is not liable to vary and consequently it furnishes a fairly stable frequency standard which can be used for the purpose indicated.

Although this invention has been shown as embodied in a certain form and arrangement of parts it is to be understood that it is not limited to the particular form shown, but is capable of embodiment in other and different forms without departing from the spirit and scope of the appended claims.

What is claimed is:

1. The method for determining the frequency of the current in a circuit comprising a source of varying potential whose frequency may be fixed, means capable of producing harmonics of the said fixed frequency, a network consisting of resistances and condensers balanced for the fixed frequency, and a current detecting device, which consists in impressing a potential from the said source upon the said harmonic producing means, applying the resultant currents to the said network and detecting the presence of harmonics by the said detecting device.

2. The method for determining the frequency of electrical oscillations in a circuit comprising a source of said oscillations, a network containing a resistance and capacity balanced for a predetermined frequency, and a frequency analyzer, which consists in impressing oscillations from the said source upon the said network, suppressing oscillations of the frequency for which the said network is balanced, allowing oscillations of other frequencies to pass therethrough to the said frequency analyzer, and determining the frequency of the oscillations thus passed.

3. The method for determining the creation of harmonics by apparatus connected into an electrical circuit containing a balanced network, apparatus to be tested and an indicating instrument, which consists in impressing a sinusoidal voltage of definite frequency across the input side of the said apparatus, allowing the resultant voltage in the output side of the said apparatus to be impressed on a network balanced for the said definite frequency, impressing the voltage of frequencies other than the definite frequency upon an indicating instrument, whereby the presence of harmonics created by the said apparatus may be detected.

4. The method for determining the creation of harmonics by apparatus connected into an electrical circuit containing a balanced network, apparatus to be tested and a detector, which consists in impressing a sinusoidal voltage of definite frequency across a network balanced for a definite frequency, allowing any potential resulting from unbalance of the said network to be impressed across the apparatus to be tested, and noting the resultant current in the detector, then impressing the sinusoidal voltage across the said apparatus, allowing the voltage resulting from the impression of said sinusoidal voltage upon said apparatus, to be impressed on the said network balanced for the said definite frequency, impressing the voltage of frequencies other than the definite frequency upon the indicating instrument, whereby the presence of harmonics due to the said apparatus may be detected.

5. The method for determining the creation of harmonics by apparatus connected into an electrical circuit containing a balanced network, apparatus to be tested and a detector, which consists in impressing a sinusoidal voltage across one end of the said circuit and noting the presence of current by a detecting device connected across the other end of the circuit, then reversing the ends of the circuit with respect to the said detecting device, and noting the difference in the readings upon the detecting device.

6. In a harmonic detecting circuit, the combination of a source of sinusoidal voltage of a definite frequency, a detecting device, a circuit containing a network balanced for a fundamental frequency, apparatus capable of producing harmonics, and switching means to connect the said source and said detecting device to opposite ends of the said circuit and to reverse the said connection.

7. In a harmonic detecting circuit, the combination of a source of sinusoidal voltage of a definite frequency, a detecting device, a circuit containing a network consisting of resistances and condensers balanced for the fundamental frequency, apparatus capable of producing harmonics, and switching means to connect the said source and said detecting device to opposite ends of the said circuit and to reverse the said connection.

8. In an electrical testing circuit, the combination with a source of currents of different amplitudes of means for substantially equalizing the amplitudes of the said currents.

9. In an electrical testing circuit, the combination with a source of testing potential of large amplitude of means for producing therefrom potentials of different amplitudes, and means for substantially equalizing the magnitudes of the potentials produced from the said original testing potential.

10. In an electrical testing circuit, the combination with a source of testing potential of large amplitude of means for producing therefrom potentials of different amplitudes, means for suppressing the original testing potential, means for substantially equalizing the magnitudes of the potentials produced from the said testing potential, and means for investigating the potentials of small amplitudes.

11. In an electrical testing circuit the combination with a source of sinusoidal current of large amplitude, of means for creating harmonics of the said currents of relatively small amplitudes, means for suppressing the current of large amplitude and for transmitting currents of small amplitudes, and means for investigating the characteristics of the currents of small amplitudes.

12. In an electrical testing circuit, the combination with a source of testing current of a definite frequency, of means for producing harmonics of the said frequency, a network comprising resistances and condensers balanced for the current of said definite frequency but not for the said harmonics and apparatus to investigate the characteristics of the harmonics transmitted through said network.

13. In an electrical testing circuit, the combination with a source of current, of means for producing variations of said current of relatively smaller amplitudes, a network comprising resistances and condensers adapted to suppress the current of large amplitude and to transmit currents of smaller amplitudes, and means for studying the characteristics of the currents of smaller amplitudes.

14. In a harmonic detecting circuit, the combination of a source of sinusoidal oscillations of a definite frequency, a detecting device, a circuit containing a network balanced for the fundamental frequency, apparatus capable of producing harmonics, a second network adapted to equalize the magnitudes of the harmonic frequencies transmitted through the said balanced network, and switching means to connect the said source and the said detecting device to opposite ends of the said circuit and to reverse the said connection.

In testimony whereof, I have signed my name to this specification this 26th day of October 1921.

HARRY NYQUIST.